July 18, 1939.  G. F. CASTLE  2,166,128
ACCELERATOR
Filed Oct. 18, 1937  2 Sheets-Sheet 1

Inventor
George F. Castle,
By Fay Oberlin + Fay
Attorney

July 18, 1939.  G. F. CASTLE  2,166,128
ACCELERATOR
Filed Oct. 18, 1937  2 Sheets-Sheet 2
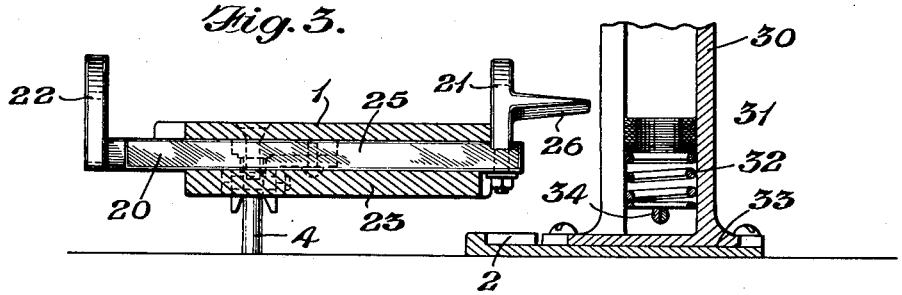
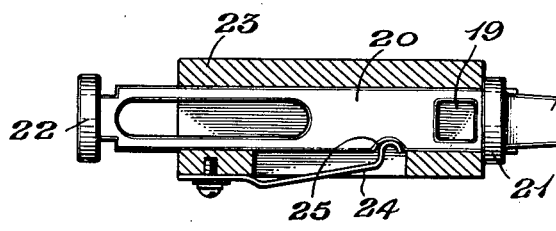
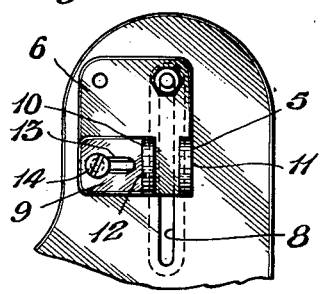
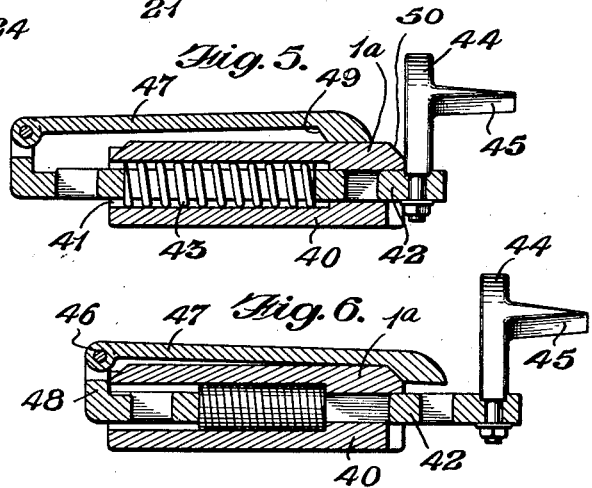
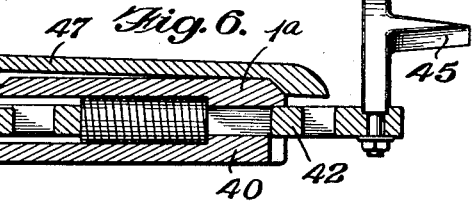
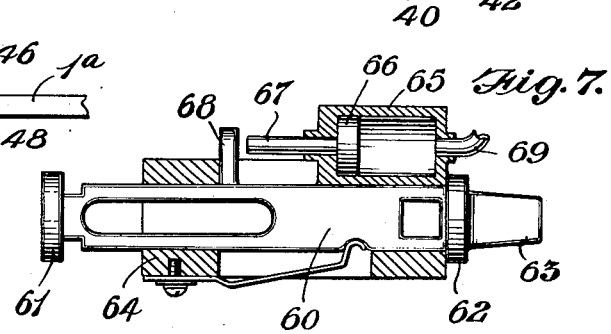
Inventor
George F. Castle,
By Fay Oberlin & Fay
Attorney Patented July 18, 1939

2,166,128

UNITED STATES PATENT OFFICE 2,166,128

ACCELERATOR

George F. Castle, Baltimore, Md., assignor of one-half to Henry A. Buhman, Baltimore, Md.

Application October 18, 1937, Serial No. 169,717

14 Claims. (Cl. 74—513)

The operation of modern automobiles, trucks and busses has materially increased the average trip length of such vehicles due to improvements in riding comforts as well as improvements in mechanical devices, such as engines, shock absorbers, and other means rendering it quite easy to take relatively long cross country trips. This in turn has resulted in one outstanding discomfort in driving, namely, the strain or leg cramp produced by constantly holding one foot upon the accelerator. Hand throttles which sought to eliminate this strain have proven of no great value and are used at present as emergency equipment only. Practically all self propelled vehicles are equipped with foot accelerators which require constant application of the driver's foot. Obviously greater driving comfort can be obtained if the accelerator can be retained at any desired speed by an easy manipulation of the foot, thus permitting the driver the freedom from continued pedal pressure.

The invention described herein is not limited to vehicles as it can be applied to motor boats, aeroplanes, military equipment such as tanks and trucks and any other apparatus where there is a speed control rod, arm or lever. In fact tractors present an ideal field of usage as they travel over rough terrain where it is highly desirable to maintain an even flow of fuel, which is difficult to do with conventional apparatus as the driver's foot moves with each bouncing movement of the tractor.

The object of the present invention is accordingly to provide a means adaptable to a conventional foot accelerator, such means being engageable when desired to relieve leg fatigue and to secure an even driving speed.

It is also an object of the invention to provide a means for supplying gasoline or any other fuel in a constant regulated amount.

It is a further object of the invention to eliminate to a great extent the wear which occurs from back lash.

It is a still further object of the invention to reduce the fuel consumption of a self-propelled vehicle through the medium of uninterrupted acceleration.

Another object of the invention is to provide a safe guard for breaking in a new motor.

A still further object of the invention is to provide means for preventing theft of a motor vehicle.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but several of various mechanical forms in which the principle of the invention may be used.

In the accompanying drawings:

Fig. 3 is a sectional view taken on the line 3—3 of Fig. 1.

Fig. 4 is a partial horizontal section of the latch mechanism.

Fig. 5 is a sectional view similar to Fig. 3 showing a modified form of latch member.

Fig. 6 is a sectional view similar to Fig. 5 showing the latch member in engaged position.

Fig. 7 is a partial horizontal section similar to Fig. 4 showing a modification employing fluid pressure.

Fig. 8 is a plan view taken from below of the upper part of the accelerator pedal as shown in Fig. 1; and Fig. 9 is a partial side elevation taken from the left hand side of Fig. 5.

Figures 1, 2:
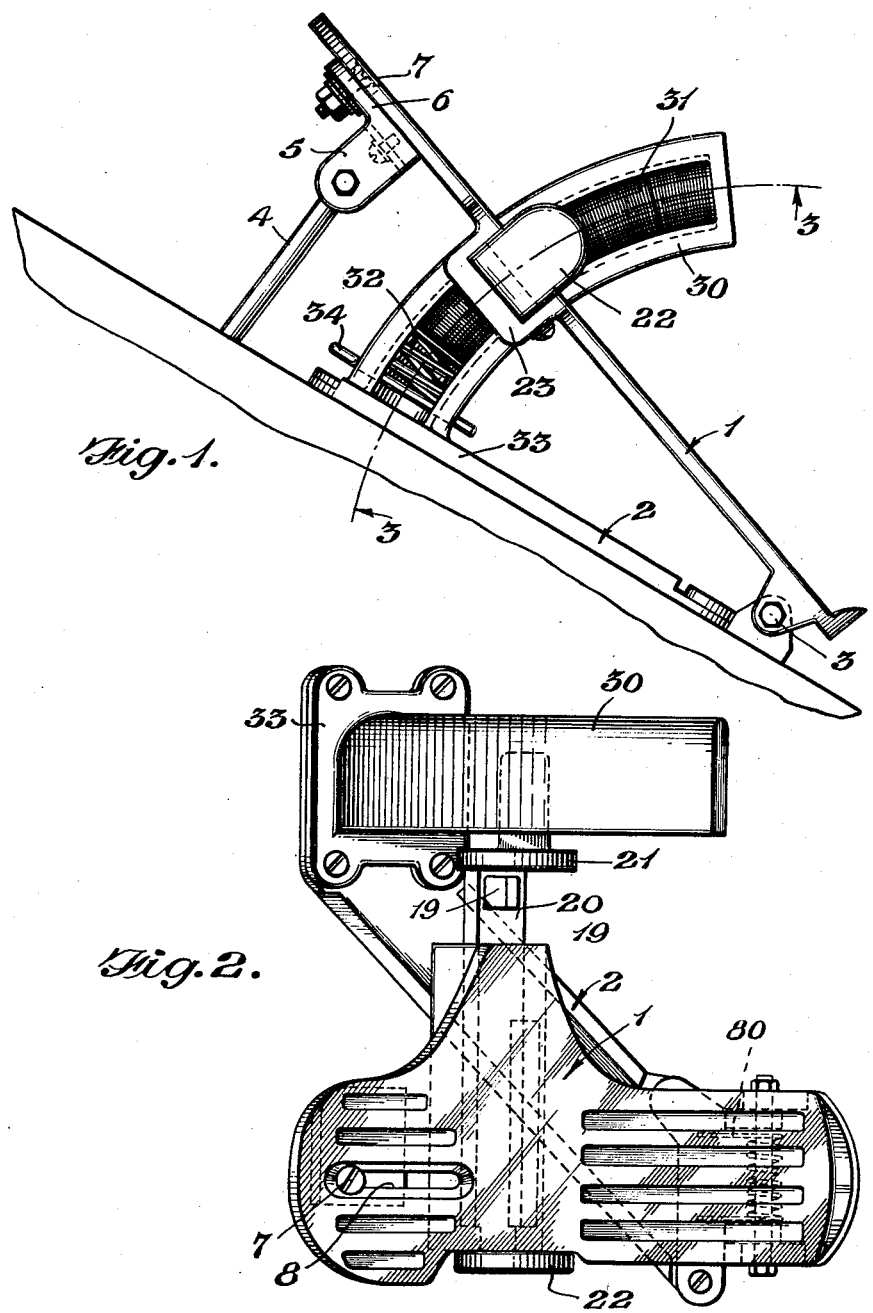
Fig. 1 is a side elevation of one form of the device.
Fig. 2 is a plan view of Fig. 1 taken from above.

The several forms of the invention shown in Fig. 1, 2, 3 and 8 illustrate my accelerator pedal connected to an accelerator rod but it is, of course, to be understood that the invention is applicable to the inverted spoon type accelerator or any fuel feed control. Where the vehicle is equipped with the last mentioned type of accelerator no positive connection is necessary as the foot pedal can be so mounted as to slide upon the spoon. This is such an obvious expedient that the same has not been illustrated, nor have the various forms of fuel feed controls been shown as a combination of the present device with all such controls is contemplated.

In Fig. 1 a pivotally mounted accelerator pedal 1 is shown, such pedal being connected to a base 2 by some such means as a bolt 3. This pedal is obviously adapted for arcuate movement and connects with an accelerator rod 4 by means of the lug 5. The lug 5 has a flat portion 6 which abuts the lower surface of the pedal 1 and is connected to such pedal by means of the screw 7. The screw 7 is seated in a recess 8, thus providing for longitudinal adjustment of the attaching bracket (see Fig. 8). Obviously, the bracket 6 may be rotated so that the depending lug 5 can assume any one of a large number of positions. In order to impart further flexibility so that my device is readily attached to a large number of different types of self propelled apparatus, I have provided a second and smaller bracket 9 that has a depending lug 10. The lug 5 has an aperture 11 and the lug 10 has an aperture 12, either or both of which are adapted to receive the bent end of an accelerator rod 4. The bracket 9 is provided with a slot 13 which in conjunction with the screw 14 permits rotational or longitudinal adjustment of the smaller bracket.

The connection comprising the brackets 6 and 9 for attaching the accelerator rod to the bottom of the pedal is obviously adaptable to all style rods inasmuch as it is adjustable up and down and since both brackets may be transposed to practically any position. Obviously then, my device can be sold as a unit and installed in all types of self propelled apparatus that are provided with an accelerating means.

The means for retaining the accelerator pedal 1 in any desired position in all forms of the invention comprises a latch member that is transversely slidable with respect to such pedal, such latch member having a pointed tooth which engages a series of loose disks held in a slotted retaining tube.

In the particular form shown in Figs. 1 to 4, inclusive, the latch member consists of a bar 20 having upstanding push lugs 21 and 22 so that the driver by a small twist of his foot may release or engage the latch. The bar 20 is slidably held immediately beneath the pedal 1 in a recess formed by the small yoke 23. This yoke may or may not be integral with the pedal. The bar 20 is frictionally engaged by the spring member 24 which exerts sufficient pressure to hold the latch out of engagement when the curved end thereof is seated in the recess 25.

This spring member 24 also prevents rattling of the bar 20 after long usage and at the same time it prevents undue transverse movement of the bar 20.

A pointed tooth 26 extends outwardly from the push lug 21 so that upon movement of the latch member such tooth enters between any two disks in the retaining tube or standard 30. The retaining tube 30 is provided with a hollow interior in order to receive a series of preferably thin disks 31, these disks being resiliently held together by means of a coil spring 32 located at the base of the retaining tube 30. The retaining tube 30 has a base 33 which is attached to the base member 2 so that all of the parts of the device are held in assembled relationship as a single unit. A cotter pin 34 or equivalent, such as a bolt, may be used to hold the spring 32 removed and slightly above the base 33 in order to render dismantling of the coil spring 32 and disks 31 quite simple, and the disks 31 are preferably made with thin bevelled outer edges in order that the tooth 26 may be readily engaged by such disks. This shape of the disks in conjunction with the coil spring permits easy entrance of the tooth 26, but at the same time once the tooth is engaged the resilient pressure is sufficient to hold the same in latched position. Furthermore, the thin bevelled edge on the disks imparts extremely fine adjustability.

That part of the bar 20 at the right hand side (as viewed in Fig. 3) performs three functions. The pointed tooth provides an easy means of engagement, the upstanding portion 21 provides a means of pushing the bar into engagement and the part beneath the push lug 21 provides a stop limiting the return movement.

The preceding operation has dealt with one form of the invention where the latch is manually released or engaged by means of slight pressure upon the push lugs 21 and 22. Obviously, a person desiring to maintain any selected speed may do this by merely urging the latch member 20 to the right as viewed in Fig. 3, whereupon the tooth 26 is engaged by the loose disks 31 and resiliently held in place. A slight oscillation of the foot has been found to be fully sufficient for this purpose.

In Figs. 5, 6 and 9 I have illustrated a latching member somewhat similar to that previously described, but in this instance the latching member is provided with an automatic trip. This particular device is designed for drivers who prefer to constantly maintain one foot upon the accelerator without exerting any pressure. It is also designed to prevent serious accidents where the driver or operator becomes sick or dies, as the pedal will rise cutting off the fuel supply the moment the foot of the operator is removed.

In this modification the pedal 1A is provided with a yoke 40 having a recess 41 for the reception of a sliding latch bar 42. This bar is normally held in released position by means of a coil spring 43 which is seated in the recess 41 and has a tendency to normally urge the latch member 42 to the left as viewed in Figs. 5 and 6. The latch bar is provided with one push lug 44 which has a sharpened tooth 45 that functions in exactly the same manner as tooth 26. Upon the end of the bar 42 opposite the push lug 44 a hinge pin 46 is provided which pivotally connects the trip member 47 to the upstanding end of the bar 42. This trip member is in turn provided with an angular engaging surface 49 that cooperates with a complementary surface 50 on one longitudinal edge of the pedal 1A.

In operation the latch member 42 is pushed to the right, whereupon the tooth 45 slides between two disks of the series of resiliently held disks. At the same time the trip member 47 moves to the right so that the engaging surfaces 49 and 50 abut and maintain the latch member in engaged position. If the driver is suddenly forced to apply his foot brake, removal of his foot from the trip member 47 immediately causes disengagement of the latch member due to the magnitude and strength of the coil spring 43 which is sufficient to overcome the engaging relationship between abutting surfaces 49 and 50. As soon as the driver's foot is removed from the pedal the parts assume the position shown in Fig. 5 and the accelerator pedal immediately rises, thus cutting off the supply of fuel.

In the event that the self propelled apparatus is equipped with a fluid pressure braking means I have designed a modification shown in Fig. 7 which is connected to the master cylinder preferably, of such braking system. In this instance the sliding latch member 60 is provided with push lugs 61 and 62 similar to the previously described push lugs and a tapered tooth 63 adapted to be resiliently engaged by a series of resiliently held disks such as those shown in the retaining tube 30. The yoke 64 which preferably lies immediately beneath the accelerator pedal is provided with a fluid pressure cylinder 65 having a piston 66 therein that has a portion 67 that directly abuts a portion 68 of the latch member 60. The flexible conduit 69 extends from the master cylinder and upon application of the brake of the vehicle, or other apparatus, fluid pressure causes the piston 66 to move to the left and assume the position shown in Fig. 7, thus withdrawing the pointed tooth 63 from between two disks and permitting the pedal to move upwardly and cut off the fuel supply. It is of course to be understood that the hydraulic cylinder is to be used to disengage the accelerator and that engagement always takes place because of a manual operation.

In this embodiment it is merely necessary to touch the brake pedal without any touching of the accelerator pedal except when the same is engaged. This means that after a certain speed is set the operator has one foot free thus rendering operation more comfortable and free from leg cramp. Also, in an emergency the driver has only one step to perform, namely, application of the brake, instead of first removing his foot from the accelerator pedal, and then applying the brake. In this respect the modification of Fig. 7 differs from the modification of Figs. 5 and 6 as in those constructions the foot must be held upon the pedal at all times.

The latch members and more particularly the bars thereof may be provided with openings 19 (see Figs. 2 and 3) of sufficient size to permit the reception of a padlock. Thus it will be seen that the accelerator pedal can be moved to closed or fuel shut off position, the latch member engaged and then locked in place. This will effectively prevent theft of the self propelled apparatus as all motors require some degree of acceleration especially when starting or shifting gears.

It will now be seen that I have provided an accelerator which may be used in exactly the same manner as a conventional foot accelerator or may be changed to an automatic device at will. It will be noted that this accelerator can be engaged instantly whenever desired to relieve leg fatigue and at the same time to secure an even fuel supply. It will also be observed that in order to disengage my latch it is merely necessary to press slightly upon the push lugs, in one embodiment. In another modification it is merely necessary to lift the foot from the automatic trip which instantly releases the latch.

In a still further modification hydraulic pressure is employed as a means of releasing the latch member, wherein mere application of the foot or hand to the brake lever, makes it unnecessary to contact the accelerator with the foot for disengagement.

It is to be understood that a mere reversal of parts is within the purview of this invention and that the accelerator pedal could have a retaining tube, such as the member 30, mounted thereon so that the same could be moved with respect to the pedal into engagement with a stationary finger.

If desired a spring 80 may be used to normally force the pedal 1 upwardly although most accelerators are usually provided with some spring means to force the same to closed position.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In apparatus of the character described, the combination of a pivoted accelerator pedal, means to retain said pedal against movement in either direction and means for connecting said pedal to an accelerator rod, said last-named means including a plate member having a lug connected thereto, said lug having an aperture therein for the reception of the end of an accelerator rod, said pedal member having a slot therein and connecting means extending through said slot for adjustably mounting said plate member upon said pedal.

2. In apparatus of the character described, the combination of a pivoted accelerator pedal, means to retain said pedal against movement in either direction and means for connecting said pedal to an accelerator rod, said last-named means including a plate member having a lug connected thereto, said lug having an aperture therein for the reception of the end of an accelerator rod, said plate member having a bracket attached thereto, said bracket having a downwardly extending portion with an aperture therein.

3. In apparatus of the character described, the combination of a pivoted accelerator pedal, means to retain said pedal against movement in either direction and means for connecting said pedal to an accelerator rod, said last-named means including a plate member having a lug connected thereto, said lug having an aperture therein for the reception of the end of an accelerator rod, said plate member having a bracket attached thereto, said bracket having a downwardly extending portion with an aperture therein, and another portion with a slot therein whereby said bracket may be secured to said plate member in selected positions.

4. In control apparatus of the character described, the combination of an accelerator pedal and means to positively retain said pedal against movement in either direction, said means including a latch member movable transversely of said pedal, said latch member having upstanding push lugs, and spring means frictionally engaging said latch member to retain it in selected transverse positions.

5. In control apparatus of the character described, the combination of an accelerator pedal and means to positively retain said pedal against movement in either direction, said means including a latch member movable transversely of said pedal, said latch member having upstanding push lugs, and a leaf spring frictionally engaging said latch member to retain it in selected positions.

6. In control apparatus of the character described, the combination of an accelerator pedal and means to positively retain said pedal against movement in either direction, said means including a latch member movable transversely of said pedal, and fluid pressure means cooperatively disengaging said latch member.

7. In control apparatus of the character described, the combination of an accelerator pedal and means to positively retain said pedal against movement in either direction, said means including a latch member movable transversely of said pedal, said latch member having upstanding push lugs, and means frictionally engaging said latch member to retain it in selected transverse positions, a fluid pressure cylinder mounted adjacent said latch member, and having a piston therein, a portion of said piston abutting a portion of said latch member.

8. In control apparatus of the character described, the combination of an accelerator pedal, a latch member, latch retaining means and means for maintaining said latch member engaged or disengaged with said retaining means;

said latch member being transversely slidable of said pedal, said means for maintaining said latch member engaged or disengaged comprising resilient means normally urging said latch member out of engagement and a trip member connected to said latch member, said trip member and said pedal having cooperating engaging surfaces whereby the weight of a driver's foot is sufficient to retain said latch member engaged.

9. In control apparatus of the character described, the combination of an accelerator pedal, a latch member, latch retaining means and means for maintaining said latch member engaged or disengaged with said retaining means; said latch member being transversely slidable of said pedal, said means for maintaining said latch member engaged or disengaged comprising resilient means normally urging said latch member out of engagement and a trip member overlying and hingedly connected to said latch member, said trip member and said pedal having cooperating engaging surfaces whereby the weight of a driver's foot is sufficient to retain said latch member engaged.

10. In control apparatus of the character described, the combination of an accelerator pedal, a latch member, latch retaining means and means for maintaining said latch member engaged or disengaged with said retaining means; said latch member being transversely slidable of said pedal, said means for maintaining said latch member engaged or disengaged comprising resilient means normally urging said latch member out of engagement and a trip member connected to said latch member, said trip member and said pedal having cooperating engaging surfaces whereby the weight of a driver's foot is sufficient to retain said latch member engaged, said resilient means being of sufficient magnitude to cause said latch member to slide out of engagement when a driver's foot is lifted from said member.

11. In a control device of the character described, an accelerator pedal and a latch member, said latch member being slidably retained adjacent said pedal, a trip member connected to said latch member adjacent one longitudinal edge of said pedal, the other edge of said pedal having an angular surface and said trip member having a complementary angular surface.

12. In a control device of the character described, an accelerator pedal and a latch member, said latch member being slidably retained beneath said pedal, a trip member overlying and being hingedly connected to said latch member adjacent one longitudinal edge of said pedal, the other edge of said pedal having an angular surface and said trip member having a complementary angular surface.

13. In a control device of the character described, an accelerator pedal and a latch member, said latch member being slidably retained adjacent said pedal, a trip member connected to said latch member adjacent one longitudinal edge of said pedal, the other edge of said pedal having an angular surface and said trip member having a complementary angular surface, said latch member being normally held out of engagement by spring means.

14. In control apparatus of the character described, the combination of an accelerator pedal and means to positively retain said pedal against movement in either direction, said means including a latch member movable transversely of said pedal, said latch member having upstanding push lugs, and spring means frictionally engaging said latch member to retain it in selected transverse positions, said latch member having a pointed tooth thereon, and said means to positively retain the pedal against movement including a retaining tube having tapered disks therein, said tooth being adapted to be received between said disks.

GEORGE F. CASTLE.